Patented Feb. 10, 1942

2,272,482

UNITED STATES PATENT OFFICE 2,272,482

COMPOSITION OF MATTER AND METHOD OF MAKING

Ernest D. Sackett, West Somerville, Mass., assignor of one-half to North American Holding Corporation, Syracuse, N. Y., a corporation of New York, and one-half to Parshad Holding Corporation, Syracuse, N. Y., a corporation of New York No Drawing. Application September 3, 1937, Serial No. 162,383

10 Claims. (Cl. 106—38)

This invention relates to a composition of matter, suitable for use as a binding agent, generally, and more particularly in filler compositions for filling the bottom of shoes, and to a method of making the same.

In the art of making shoes it is necessary to fill the cavity formed between the soles of the shoe and the inturned edges of the upper. The compositions employed for this purpose fall into two categories, known as hot fillers or cold fillers, depending upon the character of the operations involved and the condition in which they are applied to and spread in the shoe. Each type of operation and composition has its own particular advantages and conveniences.

The present invention is directed toward the preparation of a filler composition which is suitable for use and application while cold—that is, at ordinary room temperatures. It is an object to provide such a composition which, apart from the usual properties desirable in a shoe filler, shall be light in weight, more or less light in color, economical and convenient in manufacture and application, and hence derived from readily available raw materials which are not of high price, but reliable in quality and capable of easy duplication and manipulation. It is also an object to provide a filler composition in which any tendency toward slipping or squeaking shall be prevented. Other objects will appear from the following disclosure.

In accordance with this invention, and its application for shoe filler compositions, it is found preferable to use a relatively firm, resilient, body material, in comminuted or granular form, the individual granules of which are form-retaining and self-sustaining under pressure. Granulated cork is especially well suited, although other comminuted, preferably cellular, materials may be used, such as some types of coarse wood sawdust, and some ground leather scrap may be added although in most cases the latter is too variable or too dense and hard to use alone.

As a binder or bond to promote formation, retention and adhesion of the body particles together and in proper distribution in the shoe body, it is desirable to employ a material or composition which will intimately contact with and adhere both to the granular body material and to the surfaces of the shoe cavity. It is also desirable that the binder shall be capable of distribution in thin films over such surfaces. But at the same time it is not desirable that the binder shall be fluid enough to penetrate into the surfaces (or at least beyond the external cavities of the surface) since such penetration not only wastes binding agent but makes the body material heavier and detracts from its very desirable properties of resiliency, flexibility and springiness or elasticity.

It is also desirable that the binder component and the filler composition as a whole, shall be freely spreadable and sticky; that it shall presently, preferably in a matter of a few minutes after being spread out in a thin film, take a preliminary "set" by evaporation of a volatile liquid vehicle, therefrom, but that it shall thereafter remain adhesive, or tacky under slight pressure, and furthermore, that such setting shall not continue to develop stiffness or hardness in the mass, but on the contrary leave it freely flexible, and resilient, without appreciable shrinkage and retain these properties substantially permanently and unchanged.

It is now found that a component of the binder, a material derived from the concentrated non-cellulosic material of wood, by removing rosin and readily volatile and freely fluid substances therefrom, is especially adaptable. This material may be derived from coniferous woods, such as fir, pine, etc.

To this end, the wood is first reduced to chips and the chips are steam distilled to remove the turpentine which is contained in them. The chips are then extracted with a volatile liquid hydrocarbon solvent, as for example gasoline or benzol. The extraction liquor is drawn off from the chips and is distilled to remove the hydrocarbon solvent, which is condensed and recovered for re-use. The remaining liquor is then distilled further and to a somewhat higher temperature. Sufficient to expel the pine oil which remains, such distillation leaves a molten charge in the still which consists substantially of rosin. This may be further treated for the manufacture of the various grades of rosin required.

For the purpose of the present invention, the pine oil distillate obtained as above described, is heated to expel its more fluid or volatile components. The resulting product is known as pine oil foots. For the purpose of the present invention, however, it is improved by prolonged heating and this may also be promoted by the application of vacuum. The remaining product is characterized by being viscous, substantially non-volatile up to 200° C., and of relatively constant and dependable properties. A typical example of pine oil foots which have been prepared and purified in this manner and which may be very satisfactorily employed in the present invention have the following properties:

Specific gravity, 15.6/15.6° C_____ 1.032
Melting point, approximately
                        degrees centigrade__ 50
Flash point_____do____ 220
Viscosity by Saybolt Universal method
    at 100° C _____seconds__ above 300

Another material, suitable for the purposes of this invention, may be obtained from the waste liquor resulting from the cooking of Southern pine pulp wood by the soda precess. The black liquor as thus obtained is drawn off from the digestor and first concentrated by evaporation. It contains a high proportion of resinous and fatty acid soap. On concentrating by evaporation, this soap salts out and is readily removed from the liquor. The resinous matter and fatty acid soaps, thus separated from the liquor, are then acidified and the material distilled. During the distilling operation a heavy oil is distilled off. On settling, the oil separates as abietic acid crystallizes out giving a product which is almost pure rosin. The remaining oil is high in fatty acids content and is used as a substitute for red oil.

The residue remaining in the still after such distillation is suitable for use in the present invention and its melting point and penetration may be controlled fairly accurately. For example, after distilling off the heavy oil as above described, the heat may be kept on the still for any desired length of time. The longer the heat is applied, the heavier the residue becomes.

The material obtained by either of the procedures above described, is brought into suitable condition to facilitate mixing by adding a volatile hydrocarbon solvent. Its properties may be modified by additions of rosin, to raise the softening point or to increase its hardness when cold. Miscible softeners may also be added.

If the distillation and purification treatment of the residue material is carried to just the proper point or condition to develop the desired consistency therein, subsequent addition of rosin or softeners, etc., may not be necessary. But usually it is more convenient and reliable to proceed as above described.

Under some circumstances, the residue as thus prepared may serve satisfactorily as a binder for various materials, per se, or when dispersed in a suitable hydrocarbon vehicle or solvent to facilitate distribution and application of the same.

Ordinarily, however, it is desirable, in one aspect or another, to modify the properties of the residue by the addition of other substances.

For example, in accordance with the present invention, it is found that the binder can be greatly improved in several respects by the suitable incorporation therewith of rubber. It is found to be essential that the rubber should be crude, unvulcanized rubber which has not been subjected to milling. Such a rubber may be derived from rubber latex in various ways. It may be prepared simply by de-watering the latex, with or without supplementary washing to remove associated water soluble substances such as preserving agents, soluble proteins, mineral matter, etc. It may also be prepared by coagulating the rubber with acid, by evaporation, by boiling etc. Or the usual commercial grade of smoked crude rubber may be used entirely satisfactorily.

The important feature is that the rubber herein to be used is one which has not lost its inherent cellular or gelatinous space structure. This structure is destroyed by milling or like drastic treatments of rubber masses, and upon treatment with coal tar solvents, for example, such milled rubber forms thick viscous solutions such as are typified by rubber cements generally. Such rubber solutions or liquids do not spread readily and are extended into thin films so that when mixed with granular material the granules are substantially in contact with each other and resist spreading.

By using fresh, unmilled rubber, however, a mass which is paste-like (as distinguished from fluid cements or rubber solutions) and of a freely spreadable and extensible consistency, may be prepared by soaking the rubber in a petroleum hydrocarbon, which is preferably freely and substantially completely volatile, such as petroleum naphtha. The resulting mass is of an unctuous and almost greasy consistency and hence possesses a slipperiness which is not manifested by solutions of rubber. Upon introducing it into mixtures with other materials, it imparts its lubricating qualities thereto, which apparently dominate sufficiently, for example, to permit a spreading knife to be drawn through or across a mass of the composition, under pressure, without appreciable adherence. At the same time, it does not interfere with nor prevent the firm adhesion of the mass with other surfaces such as a shoe cavity, into which the mass may be pressed and spread.

If the rubber has been initially coagulated in a more or less finely subdivided condition, it is in convenient form for the next stage of treatment. If it has been coagulated in large lumps or masses, or sheets, it will be found desirable to cut them up into thin slices. The rubber is treated with a comparatively large volume (e. g. ten times) of a hydrocarbon liquid, such as petroleum naphtha, for example, which is effective to swell the rubber into a gelatinous mass, and agitated in suitable apparatus, such as a cement mill. But an excess of the hydrocarbon is not employed beyond that required to effect complete swelling of the rubber to a gelatinous or pasty condition. The mixing operation does not have the usual effect of "working" the rubber, for the naphtha first swells and gels the rubber, softening it into a jelly-like (but not tough) gelatinous consistency. This goes into the form of a paste fairly readily and produces an easily disintegratable or spreadable rubber jelly, which is both swelled and surrounded by the hydrocarbon liquid. When thoroughly mixed and diluted, it may appear to constitute a rubber solution, in some respects, but it is believed that this relationship between the rubber and petroleum naphtha is doubtful, at least to any appreciable extent. On the other hand, upon squeezing and subjecting the jelly to intimate contact, as by rubbing between the fingers, it appears to destroy the cellular or gelatinous structure and to develop superficial adhesiveness and to feel sticky to the fingers. This may be due to the presence of small, superficial amounts of truly dissolved rubber. Upon repeating such rubbing treatment, however, the rubber gel becomes stringy and coagulates into long threads which cohere and are elastic.

As a consequence of this tendency, it is important throughout the preliminary preparation of the rubber to avoid compacting, squeezing, or like mechanical working of the latex or of the rubber or of the naphtha-rubber mixture. It is, therefore, desirable to mix these materials by a cutting and churning action so as to subdivide them or burst them open, and to avoid rubbing or compressing the rubber particles together, which is likely to convert the rubber to the stringy form which is not desired.

The non-cellulosic component of wood, which has been separated from the cellulosic fibres and treated as above described, is softened by warming in a steam jacketed kettle, and rosin may be added if necessary. The charge is then cooled down sufficiently to permit the addition of softeners or solvents, without appreciable volatilization of the latter. The solvent is then added, and the whole reduced to a state of free fluidity and complete, uniform miscibility, which is maintained as the temperature of the mass as a whole falls to room temperature. For example, if the residue or mixture of residue, softeners, etc., is viscous (as it usually is) the mixture is cooled and petroleum naphtha is added thereto, in small amounts, and thoroughly mixed. With or without such addition, the rubber jelly may be added in small amounts and the two components thoroughly mixed, still observing the precautions above mentioned. As the mixing proceeds, these precautions become less necessary but they may nevertheless be observed to advantage.

It is thought that in thus mixing the components, the uniformly fluid dissolved residue permeates the gelatinized masses of rubber and may form an internal phase therein or both an internal and external phase of the mass (which is essentially an emulsion) depending upon the relative amounts and volumes employed. The globules of rubber jelly may be reduced in size and subjected to greater disperson through the mass if a relatively large proportion of the naphtha is maintained and if agitation of the above described nature is applied vigorously. Prolonged action, however, tends to defeat the purpose of disintegrating and dispersing the rubber gel and induces coagulation and stringiness, as above pointed out. The petroleum naphtha is relatively expensive, however, and extremely volatile and inflammable, so that an unnesary excess is to be avoided.

At this stage the mixture of binding components which is obtained by the foregoing steps is added to a charge of granulated cork and mixed thoroughly therewith until the granules are individually coated with and at the same time dispersed in the binder composition. The binding components above described may be separately added to the granulated cork. But in this case it is preferable to add the gelatinous rubber component first. There is a tendency for some of the petroleum naphtha to penetrate and saturate the pores of the cork, but this is not harmful and is not permanent. The naphtha is extremely volatile and while it will remain in the cork granules so long as the binder is moist, it will evaporate readily enough as the binder dries out. In thus escaping from the cork and into and through the more or less viscous or plastic binder, it will leave the cork open and porous and also make the setting binder of a more or less cellular structure, which is desirable for the purposes which are herein sought to be served.

When the composition is brought to the desired consistency, it is packaged in hermetically sealed containers, such as cans, in which it may be stored and shipped, and kept until needed for use. It is then opened, and is in such condition that it may be scooped out with a putty knife or like spreading blade, deposited in the cavity of the sole of the shoe, spread therein, and levelled off. It adheres firmly to the leather, spreads smoothly and uniformly and adheres to the outersole which is subsequently applied over the filler composition and assembled with the shoe structure, by sewing (or cementing) in accordance with the usual practices of the shoe making art.

In such operations, the composition spreads freely, the rubber jelly appears to function as a sleeking agent, permitting the spreading knife to slide smoothly over and through the composition which, at the same time, wets and freely spreads over and conforms to the shoe bottom. At the same time apparently both the residue component of the binder and the rubber jelly component of the binder are effective to attach themselves to the shoe bottom. As the solvent evaporates, the rubber jelly develops a stringiness which is accentuated by the spreading action of the knife. Consequently, as the stringy characteristic of the rubber jelly becomes manifest, it is found that these strings are attached to the bottom and sole of the shoe as well as to the individual granules, and form an interlacing network throughout the mass of the filler. But as this is brought about, the loss of solvent from the mass as a whole has the effect of stiffening the wood distillate component of the binder which (in conjunction with the comminuted body material) offsets any tendency of this rubber elastic, string-like network to contract and either draw away and separate from its adhesion to the shoe bottom or to cause the latter to draw up and curl out of shape. It also prevents the rubber jelly or developing elastic network from coalescing into a continuous film or matting together, as by forming external or intervening, separating films. The dispersing matrix is therefore of sufficiently firm consistency to withstand pressures to which it may be subjected and hence to retain the shape and volume characteristics of the mass as applied to and shaped in accordance with the shoe cavity. A novel and characteristic feature of this filler composition, as it is laid in the shoe bottom, is that the thin films of the binder permit close packing of the comminuted body material which, accordingly, is not subject to shrinking when the solvent in the binder evaporates. This is a quality not heretofore attained in shoe filler compositions of the cold filler type. Moreover, the thin films of binders are substantially transparent, so that the filler composition has the appearance of moist granular cork.

The binder in the deposit, as thus left in the shoe after evaporation of the solvent, is resilient, soft and yet substantially form retaining and permanently fixed by adhesion to the walls of the shoe cavity and to the particles of solid body material. The porosity of the mass, induced by the escaping volatile solvent and also by the inherent structure and composition of the whole, as well as the large proportion of the comminuted body material to the binder component, contributes to the springiness of the filler, as it is formed in the finished shoe.

An incidental advantage of the composition as herein provided is that if the shoe containing the filler be subjected to such high temperatures as to be softened the contractile capacity of the stringy rubber network will be effective to restrain both the comminuted body material and the impregnated and entrained, softened residue, and thus offset the spreading effect which the weight of the wearer of the shoe might have upon the softened residue component as he throws his weight upon the shoe bottom.

Whether the climate be hot or cold, therefore, the shoe filler as thus provided is incapable of shifting in the shoe cavity and is, moreover, of such soft, yielding or spongy and open consistency, that it is practically incapable of producing any friction or any noise such as squeaking, which is sometimes encountered in shoe constructions.

A typical and representative composition, in accordance with the invention, may be prepared as follows:

Two pounds of crude, smoked, unmilled rubber in the form of small particles or cut into thin slices, is moistened with just enough (e. g. ten times its weight) of petroleum naphtha (at least 75% manifesting a boiling point range of 46 to 93° C.) to swell the rubber to a soft, gelatinous mass of jell-like consistency. It is then mixed and reduced to a freely workable, smooth paste by slow stirring in a cement churn.

Rubber which has been milled or otherwise subjected to mechanical working is not suitable for the present purpose because, when added to hydrocarbons, such rubbers dissolve and from concentrated, highly viscous solutions of rubber which are sticky, provide mixtures which are resistant to spreading and generally resemble rubber cement compositions of the prior art as above pointed out. The present composition, on the contrary, is not a viscous rubber solution but a swollen, gelatinous or jelly-like semi-solid mass, occupying a large volume in proportion to the rubber content and characterized by being slippery, and capable of being freely and uniformly spread out under a knife blade or spatula without clinging thereto.

Such crude, unworked, unmilled rubber, in swollen, jelly-like dispersion, may be blended with the residue above described in substantially any proportions desired. For purposes of preparing shoe filler compositions, in which the sleeking, slipperiness and non-fluid characteristics of the rubber jelly are important and desirable, it is preferable to employ a volume of the swollen rubber component of such proportions that it will impress these characteristics upon the resulting mixture as a whole. The swollen rubber, while smooth and slippery under light cutting and agitating pressures, such as involved in mixing the same, is nevertheless capable of being compacted. And under such pressures or light rubbing or squeezing actions, the adhesive qualities above noted are developed. They are somewhat temporary in character, and under continued rubbing action, for example, the rubber apparently undergoes polymerization and becomes stringy. But while in the gelatinous or pasty form it is tenaciously adhesive under light pressures. Consequently, it may serve, per se, as the binding component for the comminuted body material, by admixture therewith, preferably employing a relatively large volume of the ground cork, for example, so as to avoid appreciably thick films or matrices of the rubber jelly between the adjacent cork particles. Such dispersion of the rubber and its open formation in the jelly permits the evaporation of the hydrocarbon to leave a porous structure permitting further rapid vaporization throughout the mass.

In a typical instance of compounding the above ingredients for the preparation of a shoe filler composition, sixteen pounds of the residue material obtained from the pine oil foots as above described are mixed with eight pounds of light rosin and with a gallon of light petroleum naphtha, having a boiling point range of 60° to 90° C. as used in swelling the rubber, for example, in which the residue is dissolved to a more or less freely flowing brown liquid.

To five gallons of ground cork may now be added thirteen pounds of the gelatinous rubber component and one pound five ounces of the residue component and mixed thoroughly to produce a uniform mixture, which may be packed in friction top, or other hermetically tight containers.

To increase tackiness and fluidity or wetness and the generally free-spreading characteristics of the mixture as a whole, the amount of rubber component may be increased to fifteen pounds and the amount of residue component to three pounds. Such a mixture is more freely mobile, sticky and ready-wetting than the first and is for some purposes preferred. Other variations in either or both components may be made, as desired, to vary the resulting properties. The proportions cited are not to be regarded as limitations in any respect. It is generally desirable, however, that the volume of swelled rubber in the initial composition shall be effectively somewhat greater than the volume of the sticky component, so that its slippery, sleeking characteristic shall be effective upon the spreading knife to permit its free spreading action. For example, the resinous binder component may be used in increasing amounts by weight up to a weight approximately equal to that of the swollen rubber to increase the degree of tackiness.

The amount of cork employed may be varied but is preferably added in such amounts that the binder component completely covers the surfaces, forming a thin coating film only, leaving the mass as a whole free and crumbly, smooth and sleek upon spreading out, but tacky upon evaporation of the solvent.

Upon opening the can, the mixture is ready for use and may be dipped from the can upon a steel spreading knife or spatula, in the exact amount required. The composition is loosely granular but is self-sustaining upon the spatula and does not adhere to the bottom or edges of the spatula. It may be wiped completely free of the spatula and into the shoe cavity in a single stroke, the spatula sliding over and off from the deposited mass, forcing it into intimate adhesive contact with the shoe bottom and leaving a smooth, flat, moist slick surface on the top. The latter may be further smoothed out and spread evenly in the shoe without adhesion to the knife. At this stage, as the blade of the knife is drawn over the composition, exceedingly fine threads of the binder are seen to draw out after it, and if the mixture is torn apart, the granules appear to be strung together by minute networks of threads resembling a spider's web filament. But upon a few minutes of drying the surface becomes more firmly tacky and more strongly adhesive. Moreover, it preserves this tackiness for a long period of time. Hence, whether the sole is applied to the shoe immediately or some time thereafter, it is firmly joined to and retained upon the filled cavity, and, conversely, the latter becomes adhesively and permanently fixed in the shoe without subsequent hardening, shrinkage or displacement.

While in the procedure as first above described, the rubber and residue components are mixed together and then added to the comminuted body material or cork, it is to be understood that this order of steps is not essential. In fact, it is convenient to charge the cork into the mixer first and then add the rubber and residue components separately and while the mass is being agitated, as in the specific example cited. This avoids any tendency for the binder ingredients to adhere to the walls of the mixer, since they are first contacted with and surrounded by the cork granules. If the rubber is added first, its contact with the granules is assured and rendered predominant, while the subsequently added residue permeates the intergranular films of rubber gel.

To facilitate initial mixing and preparation of the shoe filter composition as above described, additional agents may be added which provide the ready and more complete admixture of the separate ingredients, and which also promote the uniformity and smooth plastic consistency of the composition during preparation, and use. To this end it is found that solvent activators, such as the sulphonated hydrocarbons liquefied by a liquid volatile solvent, such as butyl alcohol, may be added to advantage.

Thus, for example, 64 pounds of crude rubber may be swollen by immersing in 100 gallons of petroleum naphtha as above described, for one and a half days. To this mixture is added approximately 1000 cc. of a mixture of 75% sulphonated hydrocarbon, such as obtained from the treatment of cracked petroleum products with sulphuric acid for the purposes of purification, and 25% normal butyl alcohol.

A separate mixture is then prepared of 24 lbs. Rosin K, which is melted and mixed with 48 lbs. of the viscous, residue material from pine oil foots, above described. When the mixing is complete, the mixture is then cooled and mixed with 3 gallons of petroleum naphtha to form a solution of ladleable consistency.

Ten gallons of cork dust (less than 20 mesh) and 20 gallons of cork dust (20–30 mesh) are put into a mixing tank, which is conveniently cylindrical, mounted horizontally, and provided with revolving mixing blades to agitate the mass, without compacting it. Sixteen pounds of powdered soapstone (200 mesh) is then added, and mixed with the cork, followed by 76 pounds of the rubber component, which is thoroughly mixed with the granular cork. Then, the mixing action being continued, 12 lbs. of the rosin and residue material are added, and the mixing of the batch is continued until the charge is uniform and also while the charge is being emptied from the mixing chamber.

The composition as thus prepared is filled into cans and is suitable for keeping a long time in transportation and storage, and is of even smoother and more uniform consistency than the foregoing example, and is ready for immediate use whenever opened.

This application is a continuation in part of my application, Serial No. 39,300, filed September 5, 1935 and of my application Serial No. 14,799, filed April 5, 1935, now Patent No. 2,121,745.

I claim:

1. Method of making shoe filler compositions, which comprises the steps of heating pine oil foots to expel the volatile matter therefrom, swelling unmilled rubber to a gelatinous condition with a volatile liquid hydrocarbon solvent, and mixing the resulting materials with comminuted body material, as a binder.

2. Method of making shoe filler compositions which comprises subjecting the acidified resinous and fatty acid component of the black liquor from the soda process of making paper pulp to distillation and the residue to prolonged heating, swelling unmilled rubber to a gelatinous condition with a volatile liquid hydrocarbon, and thereafter mixing the materials as thus prepared with a volatile liquid hydrocarbon solvent and comminuted solid material, as a binder.

3. Method of making shoe filler compositions which comprises the steps of heating pine oil foots to expel the readily volatile matter therefrom, swelling unmilled rubber to a gelatinous condition with a volatile liquid hydrocarbon solvent and a sulphonated mineral hydrocarbon, mixing said components with a volatile liquid hydrocarbon solvent and with comminuted body material.

4. Method of making shoe filler compositions which comprises the steps of heating pine oil foots to expel the readily volatile matter therefrom, swelling unmilled rubber to a gelatinous condition with a volatile liquid hydrocarbon solvent and a sulphonated mineral hydrocarbon, mixing said components with a volatile liquid hydrocarbon solvent and with comminuted body material which has been previously mixed with powdered soapstone.

5. Shoe filler composition, comprising comminuted body material and a binder characterized by containing non-cellulosic matter of coniferous wood, from which turpentine, rosin, pine oil and other volatile matter has been substantially completely removed by distillation and prolonged heating, and unmilled rubber, swollen with a volatile liquid hydrocarbon solvent.

6. Shoe filler composition, comprising comminuted body material, and a binder characterized by containing pine oil foots, from which the volatile matter has been substantially completely removed by distillation and prolonged heating, and unmilled rubber, swollen with a volatile liquid hydrocarbon solvent.

7. Shoe filler composition, comprising comminuted body material, and a binder characterized by containing the residue from the crude resinous and fatty acid component of black liquor of soda pulp manufacture from which rosin and volatile matter have been substantially completely removed by distillation and prolonged heating, mixed with unmilled rubber, swollen with a volatile liquid hydrocarbon solvent.

8. Shoe filler composition, comprising comminuted body material, and a binder characterized by containing the residue from pine oil foots, from which the volatile matter has been substantially completely removed by distillation and prolonged heating, and unmilled rubber, swollen with a volatile liquid hydrocarbon solvent and a sulphonated mineral hydrocarbon.

9. Shoe filler composition, comprising comminuted body material, and a binder characterized by containing the residue from pine oil foots, from which the volatile matter has been substantially completely removed by distillation and prolonged heating, and unmilled rubber, swollen with a volatile liquid hydrocarbon solvent and a sulphonated mineral hydrocarbon plus normal butyl alcohol.

10. Shoe filler composition, comprising comminuted body material, coated with powdered soapstone, and a binder characterized by containing pine oil foots, from which the volatile matter has been substantially completely removed by distillation and prolonged heating, and unmilled rubber, swollen with a volatile liquid hydrocarbon and a sulphonated mineral hydrocarbon.

ERNEST D. SACKETT.